United States Patent
Fee et al.

(10) Patent No.: US 7,739,538 B2
(45) Date of Patent: Jun. 15, 2010

(54) DOUBLE DATA RATE CHAINING FOR SYNCHRONOUS DDR INTERFACES

(75) Inventors: Michael Fee, Cold Spring, NY (US); Patrick J. Meaney, Poughkeepsie, NY (US); Christopher J. Berry, Hudson, NY (US); Jonathan Y. Chen, Marlboro, NY (US); Alan P. Wagstaff, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/426,651

(22) Filed: Jun. 27, 2006

(65) Prior Publication Data

US 2007/0300095 A1    Dec. 27, 2007

(51) Int. Cl.
*G06F 5/06* (2006.01)
*G11C 8/16* (2006.01)
(52) U.S. Cl. .................................. 713/600; 365/233.13
(58) Field of Classification Search ................. 713/600; 365/233.13
See application file for complete search history.

(56) References Cited

U.S. PATENT DOCUMENTS

| | | | |
|---|---|---|---|
| 5,805,872 A | 9/1998 | Bannon | |
| 5,867,541 A | 2/1999 | Tanaka | |
| 5,971,889 A | 10/1999 | Ohashi et al. | |
| 6,114,886 A | 9/2000 | Seo | |
| 6,144,886 A | 11/2000 | Lee | |
| 6,166,563 A | 12/2000 | Volk | |
| 6,170,506 B1 | 1/2001 | Butwin et al. | |
| 6,202,128 B1 | 3/2001 | Chan | |
| 6,442,102 B1 | 4/2001 | Borkenhagen et al. | |
| 6,263,463 B1 | 7/2001 | Hashimoto | |
| 6,279,073 B1 | 8/2001 | McCracken | |
| 6,282,128 B1 | 8/2001 | Lee | |

(Continued)

OTHER PUBLICATIONS

Non-Final Office Action, Nov. 20, 2008, in U.S. Appl. No. 11/426,675.

(Continued)

*Primary Examiner*—Mark Connolly
(74) *Attorney, Agent, or Firm*—Jon A. Gibbons; Fleit Gibbons Gutman Bongini & Bianco P.L.

(57) ABSTRACT

A system and method in which the receiving chip separately latches each half of the data received from the double data rate bus. Each half is launched as soon as it is available; one on the normal chip cycle time and the other is launched from a Master (L1) latch a half cycle into the normal chip cycle time. The first launched half of the data proceeds through the chip along its standard design chip path to be captured by the chips driving interface latch and launched again after one cycle of latency on the chip. The second half of the data proceeds through the chip one half cycle behind the first half, and is latched a half clock cycle later part way through the path into a Slave (L2) latch. On the next edge of the local clock, the data then continues from the L2 latch to the driving double data rate interface. This allows a half cycle set up time for the second half of the data so that it can be launched again, maintaining a one-cycle time on the chip.

2 Claims, 3 Drawing Sheets

U.S. PATENT DOCUMENTS

| | | | |
|---|---|---|---|
| 6,315,692 B1 | 11/2001 | Takahashi et al. | |
| 6,335,955 B1 | 1/2002 | Knotts | |
| 6,373,289 B1 | 4/2002 | Martin | |
| 6,396,322 B1 | 5/2002 | Kim et al. | |
| 6,424,198 B1 | 7/2002 | Wolford | |
| 6,452,865 B1 | 9/2002 | Wolford | |
| 6,473,838 B1 | 10/2002 | Bass et al. | |
| 6,477,592 B1* | 11/2002 | Chen et al. | 710/52 |
| 6,493,285 B1 | 12/2002 | Wolford | |
| 6,510,503 B2 | 1/2003 | Gillingham | |
| 6,560,669 B1 | 5/2003 | Ryan | |
| 6,584,578 B1 | 6/2003 | Faue | |
| 6,603,706 B1 | 8/2003 | Nystuen | |
| 6,671,753 B2 | 12/2003 | Dreps et al. | |
| 6,715,096 B2* | 3/2004 | Kuge | 713/600 |
| 6,760,856 B1 | 7/2004 | Borkenhagen | |
| 6,826,113 B2 | 11/2004 | Ellis | |
| 6,832,294 B2 | 12/2004 | Wicki | |
| 6,838,712 B2 | 1/2005 | Stubbs | |
| 6,874,097 B1 | 3/2005 | Aliahmad et al | |
| 6,907,493 B2 | 6/2005 | Ryan | |
| 6,912,628 B2 | 6/2005 | Wicki | |
| 6,914,829 B2 | 7/2005 | Lee | |
| 6,920,576 B2 | 7/2005 | Ehmann | |
| 7,017,067 B2 | 3/2006 | Zielbauer | |
| 7,089,440 B2 | 8/2006 | Wu | |
| 7,132,854 B1* | 11/2006 | Chen et al. | 326/46 |
| 7,135,854 B2 | 11/2006 | Brian et al. | |
| 7,138,844 B2 | 11/2006 | Lee | |
| 7,225,354 B2 | 5/2007 | Tseng | |
| 7,295,489 B2* | 11/2007 | Yoon et al. | 365/233.12 |
| 7,376,021 B2 | 5/2008 | Heo | |
| 7,412,618 B2* | 8/2008 | Ferraiolo et al. | 713/600 |
| 7,440,531 B2* | 10/2008 | Dreps et al. | 375/371 |
| 2001/0046163 A1 | 11/2001 | Yanagawa | |
| 2002/0018395 A1 | 2/2002 | McLaury | |
| 2002/0130795 A1 | 9/2002 | Moon | |
| 2003/0001651 A1 | 1/2003 | Rosa | |
| 2003/0043926 A1 | 3/2003 | Terashima | |
| 2003/0065908 A1 | 4/2003 | Patel | |
| 2003/0085734 A1 | 5/2003 | Nguyen | |
| 2003/0217214 A1 | 11/2003 | Calvignac et al. | |
| 2004/0008069 A1 | 1/2004 | Welker | |
| 2004/0089069 A1 | 3/2004 | Weber et al. | |
| 2004/0071171 A1 | 4/2004 | Ghiasi | |
| 2004/0098551 A1 | 5/2004 | Heo et al. | |
| 2004/0117742 A1 | 6/2004 | Emberling | |
| 2004/0123173 A1 | 6/2004 | Emberling | |
| 2004/0148538 A1 | 7/2004 | Li | |
| 2004/0174765 A1 | 9/2004 | Seo | |
| 2004/0239288 A1 | 12/2004 | Harrison et al. | |
| 2004/0260962 A1 | 12/2004 | Suen | |
| 2005/0001655 A1 | 1/2005 | Takeda | |
| 2005/0050289 A1 | 3/2005 | Raad | |
| 2005/0105349 A1 | 5/2005 | Dahlberg | |
| 2005/0114724 A1 | 5/2005 | Wu | |
| 2005/0141331 A1 | 6/2005 | Che | |
| 2005/0157827 A1 | 7/2005 | Yoon | |
| 2005/0162187 A1 | 7/2005 | Nguyen | |
| 2005/0174145 A1 | 8/2005 | Dosho | |
| 2005/0195928 A1 | 9/2005 | Yamazaki | |
| 2007/0300095 A1 | 12/2007 | Fee | |
| 2007/0300098 A1 | 12/2007 | Chen | |
| 2007/0300099 A1 | 12/2007 | Chen | |

OTHER PUBLICATIONS

Non-Final Office Action, Nov. 25, 2008, in U.S. Appl. No. 11/426,648.
Non-Final Office Action, Dec. 11, 2008, in U.S. Appl. No. 11/426,651.
Non-Final Office Action, Dec. 16, 2008, in U.S. Appl. No. 11/426,666.
Non-Final Office Action, Dec. 18, 2008, in U.S. Appl. No. 11/426,671.
Final Office Action, Apr. 23, 2009, in U.S. Appl. No. 11/426,675.
Final Office Action, Jun. 03, 2009, in U.S. Appl. No. 11/426,651.
Final Office Action, Jun. 15, 2009, in U.S. Appl. No. 11/426,648.
Non-Final Office Action, Aug. 13, 2009, in U.S. Appl. No. 11/426,675.

* cited by examiner

DOUBLE DATA RATE CHAINING FOR SYNCHRONOUS DDR INTERFACES

CROSS-REFERENCE TO RELATED APPLICATIONS

This application contains subject matter that is related to the subject matter of the following co-pending applications, each of which is assigned to the same assignee as this application, International Business Machines Corporation of Armonk, N.Y. Each of the below listed applications is hereby incorporated herein by reference in its entirety: Late Data Launch for a Double Data Rate Elastic Interface, Ser. No. 11/426,671; Programmable Bus Driver Launch Delay/Cycle Delay to Reduce EI Elasticity Requirements, Ser. No. 11/426,666; Mechanism for Windaging of a Double Rate Driver, Ser. No. 11/426,648; Early Directory Access of a Double Rate Elastic Interface, Ser. No. 11/426,675.

FIELD OF THE INVENTION

This invention relates to a system and method for moving data among daisy chained chips over a double data rate synchronous interface between the chips, and more particularly to a system and method to remove added latency introduced by serialization of data on a chip in the chain where the local clock of a chip in the chain is the same as the synchronous interface clock frequency.

BACKGROUND OF THE INVENTION

In digital data systems in general and in computer and telecommunications systems in particular, there is an ever-increasing drive for larger bandwidth and higher performance. These systems are comprised of discreet integrated circuit chips that are interconnected. Data moves through a chip and between chips in response to clock pulses, which, among other things, maintain synchronization of the data in parallel paths. At the extremely high data rates in today's systems, variations in the propagation of data over a bus along one path as compared to another path on the bus (i.e. skew) can exceed one clock cycle. U.S. Pat. No. 6,334,163, which is assigned to the assignee of this application and is incorporated herein by reference, discloses a so called Elastic Interface (EI) that can compensate for bus skew greater than one clock cycle without a performance penalty. However, packaging technology has not been able scale up to match the performance and bandwidth of the chip and interface technologies. In order to reduce the number I/O terminals on a chip and the number of conductive paths in a bus between chips, the prior art transfers data at a so called Double Data Rate (DDR), in which data is launched onto the bus at both the rising and falling edges of the clock. This allows the same amount of data to be transferred (i.e. bandwidth) with only half the number of bus conductors and half the number of chip I/O ports, as compared with a system where data is transferred only on a rising or a falling clock edge. Here it should be noted, that only half the data as compared to bus with twice the conductors is sent on each edge, referred to as the odd and the even half for convenience.

Often a double data rate bus is used between one chip and a next chip and another double data rate bus is used between that next chip and a still another chip. This so called daisy chain of chips with double data rate interfaces, typically includes a chip or chips with a local clock frequency that is the same as the double data rate synchronous interface clock frequency. In the prior art as illustrated in FIG. 1, the odd and even half of the data is aligned at the receiver to the on chip clock and then later driven across the next interface at the double data rate frequency. This alignment or serialization step requires that part of the data wait for all parts of the data to become available to the receiving chip, which increases the latency of the data. The prior art DDR synchronous interface adds an extra cycle receiver delay to align data before sending data out to a DDR data driver. On the DDR data driver side, another cycle extra delay is also needed if signal arrive at the driver later than the DDR driver launch setup time (data arrive later than the driver Master latch clock rising edge). In order to process DDR data with the synchronous clock on chip, DDR data stream is pipelined through two separate internal data paths. One data path is for the data corresponding to the half clock cycle when the DDR synchronous clock is high (known as the Even data), the other data path is for the data corresponding to the half clock cycle when the DDR synchronous clock is low (known as the Odd data). The shortcomings of the prior art are that the Even data are delayed a cycle to line up with the Odd data at the DDR receiver output port then pipelined to the chip internal logic. At the last stage of the data path pipeline, the Odd data are held an extra half cycle before launching off the chip.

SUMMARY OF THE INVENTION

An object of this invention is the provision of an improved system and method that moves data through a daisy chain of chips with a double data rate bus input and output.

Briefly, this invention contemplates a system and method in which the receiving chip separately latches each half of the data received from the double data rate bus. Each half is launched as soon as it is available; one on the normal chip cycle time and the other is launched from a Master (L1) latch a half cycle into the normal chip cycle time. The first launched half of the data proceeds through the chip along its standard design chip path to be captured by the chips driving interface latch and launched again after one cycle of latency on the chip. The second half of the data proceeds through the chip one half cycle behind the first half, and is latched a half clock cycle later part way through the path into a Slave (L2) latch. On the next edge of the local clock, the data then continues from the L2 latch to the driving double data rate interface. This allows a half cycle set up time for the second half of the data so that it can be launched again, maintaining a one-cycle time on the chip. The present invention reduces the on-chip latency from the DDR data received from one or more chips to sending the processed data to other chips (back to the same chips or to different chips). The invention takes advantage of the early availability and late launch capability provided by the DDR interface to move data through the daisy-chained chip in a way to remove the added latency of serialization. This invention eliminates the DDR receiver and driver extra cycle delays and provides flexibility on latch physical placement in the chip internal data path. The shortcomings of the prior art are overcome and additional advantages are provided through the provision of a Master latch output port for the DDR receiver Odd data path, and using "alternating" Master-Slave latches in the Odd data path pipelining the Odd data through to the DDR driver sending data off chip again. The present invention reduces the on-chip latency from the DDR data received from one or more chips to sending the processed data to other chips (back to the same chips or to different chips). The invention takes advantage of the early availability and late launch capability provided by the DDR interface to move data through the daisy-chained chip in a way to remove the added latency of serialization. This invention eliminates the DDR receiver and driver extra cycle delays and provides flexibility on latch physical placement in the chip internal data path. The shortcomings of the prior art are overcome and additional advantages are provided through the provision of a Master latch output port for the DDR receiver Odd data path, and using "alternating" Master-Slave latches in the Odd data path pipelining the Odd data through to the DDR driver sending data off chip again. The present invention is a method to reduce the on-chip latency from the DDR data received from one or more chips to sending the processed data to other chips (back to the same chips or to different chips). The invention takes advantage of the early availability and late launch capability provided by the DDR interface to move data through the daisy-chained chip in a way to remove the added latency of serialization. This invention eliminates the DDR receiver and driver extra cycle delays and provides flexibility on latch physical placement in the chip internal data path. The shortcomings of the prior art are overcome and additional advantages are provided through the provision of a Master latch output port for the DDR receiver Odd data path, and using "alternating" Master-Slave latches in the Odd data path pipelining the Odd data through to the DDR driver sending data off chip again. The invention works by having the data on the DDR bus split into 2 parts, the first and second half. Each half is launched as soon as they are available, one on the normal chip cycle time (Master-Slave latch or Flip-Flop clocking), the other is launched to the chip (internal logic) from a Master latch a half cycle into the normal chip cycle time. The first data proceeds through the chip as a normal chip path to be captured by the driving interface's latch and launched again after only one cycle of latency on the chip. The second data goes through the chip a half cycle late, reaching a Slave latch part way through the path. The data then continues into the DDR driving interface having to meet a half cycle setup time to be launched again, also maintaining 1-cycle latency on the chip.

The DDR receiver delay is reduced by using the Master latch output port of the Odd data path instead of its Slave latch output port. At the last stage of the Odd data path, data are fed to the Slave latch input port directly. This invention allows the physical placement of the last stage Odd data Slave latch to be further away from the DDR driver Master latch it feeds. The implementation choices can be Master-Slave latches and/or individual transparent latches.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
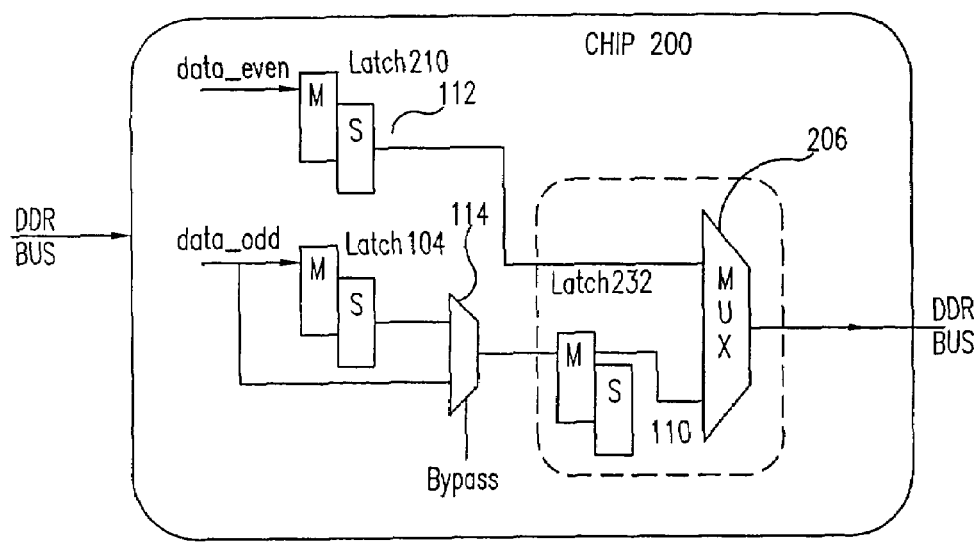
FIG. 1 is a logic block diagram of a double data rate driver with a 2-to-1 multiplexer so that the odd data can bypass the first stage of the latch in the odd path.

Referring now to FIG. 1 of the drawings, it shows a chip 200 with a double data rate driver that can be used in the practice of this invention. Like prior art double data rate drivers, it includes a master/slave latch 210 to latch the even data input (data_even) and a master/slave latch 104 to latch the odd data (data_odd). A 2-to-1 multiplexer 114 can be used to bypass the odd data latch 104. Alternatively, the latch 104 and the 2-to-1 multiplexer 114 could be physically removed from the circuit. A master latch 232 in the odd data path couples the odd data input 110 to multiplexer 206 that drives the double data rate bus, while master/slave latch 210 provides the even data input 112. The data on the DDR bus is thus split into 2 parts, the first (even) and second (odd) half. Each half is launched as soon as it is available, one on the normal chip cycle time (Master-Slave latch or Flip-Flop clocking), the other is launched to the chip (internal logic) from a Master latch a half cycle into the normal chip cycle time. The first data proceeds through the chip as a normal chip path to be captured by the driving interface's latch and launched again after only one cycle of latency on the chip. The second half of the data proceeds through the chip one half cycle behind the first half. The DDR receiver delay is reduced by using the Master latch output port of the Odd data path instead of its Slave latch output port.

Figure 2:
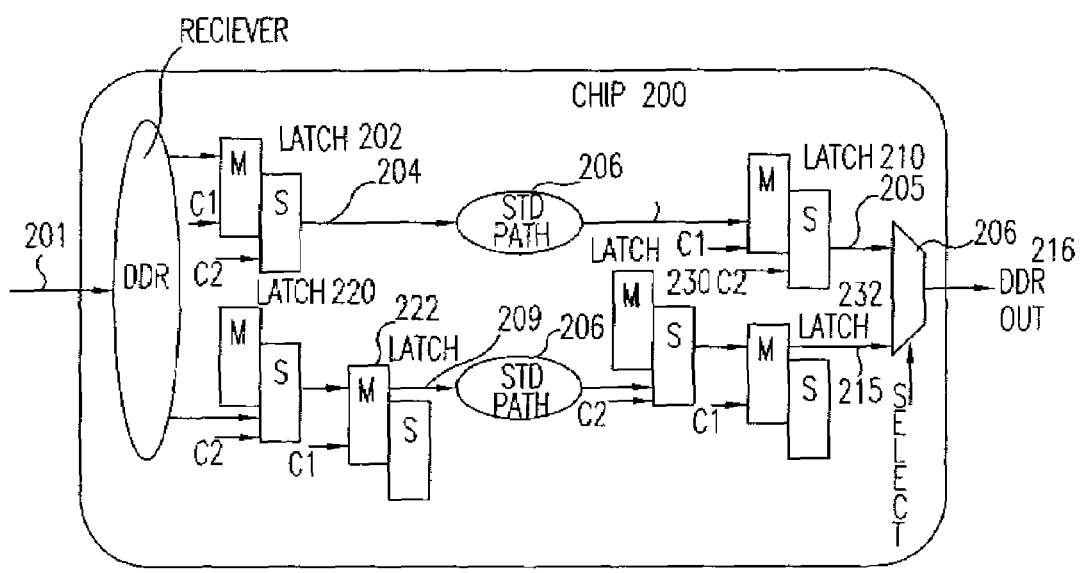
FIG. 2 is a logic block diagram of one embodiment of the system and method in accordance with the teachings of this invention
Figure 3:
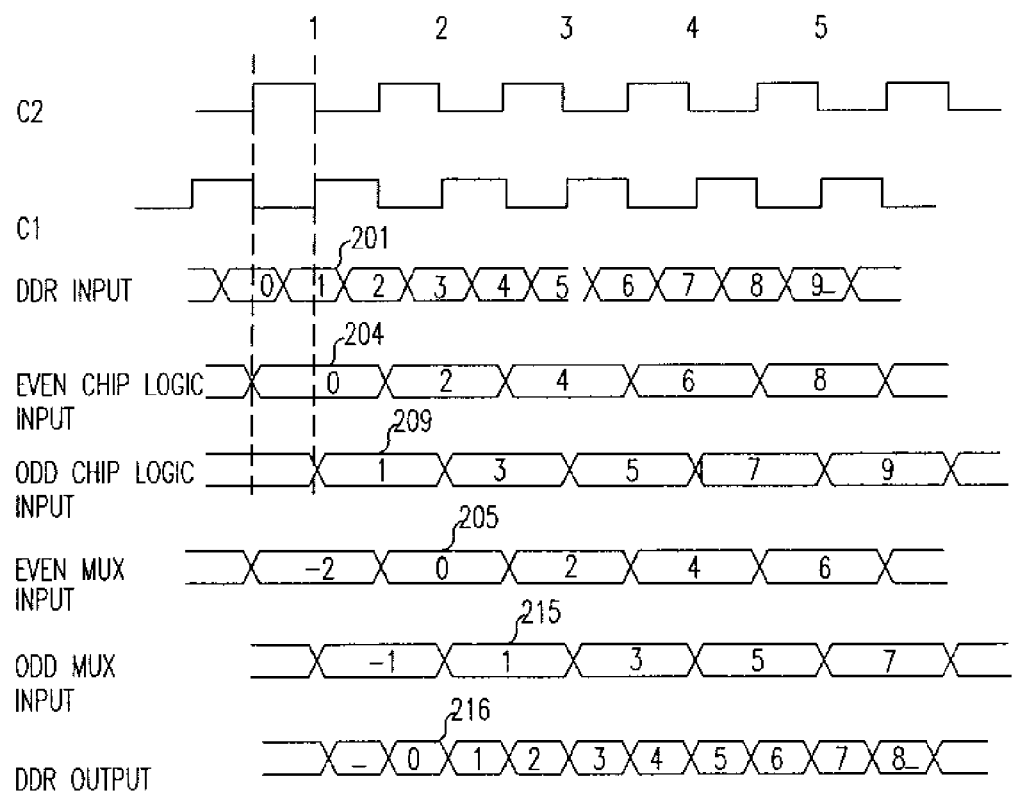
FIG. 3 is a timing diagram for the logic of FIG. 2.

Referring now to FIGS. 2 and 3, a chip 200, which has a local clock C1/C2, separately latches each corresponding half (even half and odd half) of the data received from the double data rate bus 201. The even half (0, 2, 4 . . . ) is latched into the master side of master/slave latch 202 and is immediately available at 204 from the slave side of the latch to the chip's standard design path 206 as soon as it is available at the input to the latch 202, since the local clock C1 input to the master and local clock C2 input to the slave are 180 degrees out of phase. It will be appreciated that the chip's standard design path 206 is comprised of logic elements, and in this example it is assumed that its functions take less than one local clock cycle, although in some cases may take more, up to N local clock cycle. This data, having been processed through the standard design path 206, is latched into the master side of master/slave latch 210 at the beginning of the next clock cycle and is immediately available at the input 205 to the multiplexer 206, where it can be output on the double data rate bus 216 after an N on chip latency, in this example, of one local clock cycle.

One half of the local clock cycle after the even half of the data on the double data rate bus is latched, the corresponding odd half (1, 3, 5 . . . ) of the data is latched by the slave side of master/slave latch 220 and the master side master/slave latch 222 so that it is immediately available as an input 209 to the chip's standard design path 206. After having been processed by the logic in path 206, the data is latched in the slave side of master/slave latch 230 and the master side of master/slave latch 232 where it is immediately available as an input 215 to the multiplexer 206. Since the odd data is available at the multiplexer one half cycle after the even data, it can be outputted by the SELECT input to multiplexer 206 to the double data rate bus on the clock edge following the clock edge that outputted the even data, resulting in only an N plus one local clock cycle latency on the chip, where in this case N is zero since neither the even nor the odd data teaches a full latch during the on chip portion. The second half of the data proceeds through the chip one half cycle behind the first half, and is latched a half clock cycle later part way through the path into a Slave (L2) latch. On the next edge of the local clock, the data then continues from the L2 latch to the driving double data rate interface. The invention takes advantage of the early availability and late launch capability provided by the DDR interface to move data through the daisy-chained chip in a way to remove the added latency of serialization and provides flexibility on latch physical placement in the chip internal data path. Additional advantages are provided through the provision of a Master latch output port for the DDR receiver Odd data path, and using "alternating" Master-Slave latches in the Odd data path.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for clocking synchronous data on a chip between an input port coupled to a double data rate bus and output port coupled to a double data rate bus, including the steps of:

latching a first half of the synchronous data in an L1 stage of a first input L1/L2 latch on a leading edge of a local clock signal;

latching said first half of the synchronous data signal latched in the L1 stage in the just previous latching step in the L2 stage of the first input L1/L2 latch on the next trailing edge of the local clock signal;

processing said first half of said synchronous data and latching the processed first half of the synchronous data in a first L1/L2 output latch on the next leading edge of said local clock signal;

launching the processed first half of the synchronous data on said double data rate bus on the next trailing edge of the local clock signal;

latching the second half of the synchronous data in a second L1/L2 input latch one half local clock signal after said first half of said synchronous data is latched in the L1 stage of the first input L1/L2 latch;

processing said second half of the synchronous data and latching the processed second half of the synchronous data in a second L1/L2 output latch one half of a local clock cycle after said first half of the synchronous data is latched in said first L1/L2 output latch; and latching the output from the second L1/L2 output latch in a third L1/L2 output latch one half of a local clock cycle after the second half of the data is latched in the second L1/L2 output latch; and launching the processed second half of the synchronous data via said output port on said double data rate bus as soon as it is latched in the third L1/L2 output latch whereby the on chip latency is one local clock cycle.

2. A system for clocking synchronous data on a chip between an input port coupled to a double data rate bus and an output port coupled to a double data rate bus, comprising in combination:

a first L1/L2 input latch coupled to said input port for latching a first half of said synchronous data in the L1 stage of said first L1/L2 input latch on a leading edge of a local clock signal;

processing logic coupled to the L2 stage of said first L1/L2 input latch;

said processing logic for processing said first half of the synchronous data and latching the processed first half of the synchronous data in the L1 stage of a first L1/L2 output latch on the next leading edge of said local clock signal;

the L2 stage of said L1/L2 output latch coupled to said output port for launching said processed first half of the synchronous data via said output port coupled to said double data rate bus on the next trailing edge of said local clock signal;

a second L1/L2 input latch coupled to said input port for latching said second half of the synchronous data in the L2 stage of said second L1/L2 input latch on half local clock signal cycle after said first half of the synchronous data is latched in said L1 stage of said first L1/L2 input latch; a third L1/L2 input latch with the L2 stage of the second L1/L2 input latch coupled to the L1 stage of the third L1/L2 input latch;

processing logic coupled to the L1 stage of the third L1/L2 input latch;

the L2 stage of a second L1/L2 output latch coupled to the processing logic;

the L1 stage of a third L1/L2 output latch coupled to the L2 stage of said second L1/L2 output latch;

the L1 stage of said third L1/L2 output latch for latching said second half of the synchronous data from said processing logic one half of a local clock cycle after the first half of the synchronous data is said L2 stage of said first L1/L2 output latch;

said L1 stage of said third L1/L2 latch coupled to said output port and said L1 stage of said third L1/L2 latch for launching the processed second half of the synchronous data via said output port on said double rate bus as soon as it is latched, whereby the on chip latency is one local clock cycle.

* * * * *